(12) United States Patent
Rowe

(10) Patent No.: US 8,700,730 B2
(45) Date of Patent: Apr. 15, 2014

(54) AGGREGATED AUDIO/VIDEO CROSSBAR CONNECTIONS

(75) Inventor: Stephen C. Rowe, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1711 days.

(21) Appl. No.: 11/207,859

(22) Filed: Aug. 18, 2005

(65) Prior Publication Data

US 2007/0041338 A1 Feb. 22, 2007

(51) Int. Cl.
G06F 15/16 (2006.01)
H04N 7/18 (2006.01)
H04N 7/20 (2006.01)

(52) U.S. Cl.
USPC ........... 709/217; 709/216; 709/230; 709/229; 725/80; 725/82; 725/83; 725/85; 725/78; 725/64; 725/71

(58) Field of Classification Search
USPC ............... 386/109, 123, 124; 725/39, 48, 80, 725/82–83, 85, 78, 71, 64; 709/217, 216, 709/230, 229
See application file for complete search history.

(56) References Cited

U.S. PATENT DOCUMENTS

| | | | |
|---|---|---|---|
| 5,014,267 A * | 5/1991 | Tompkins et al. | 370/259 |
| 5,782,642 A | 7/1998 | Goren | |
| 5,818,736 A * | 10/1998 | Leibold | 703/16 |
| 5,878,262 A * | 3/1999 | Shoumura et al. | 717/164 |
| 5,926,638 A * | 7/1999 | Inoue | 717/125 |
| 6,032,202 A | 2/2000 | Lea et al. | |
| 6,662,007 B2 * | 12/2003 | Yuen | 455/419 |
| 6,678,268 B1 * | 1/2004 | Francis et al. | 370/380 |
| 7,103,421 B2 * | 9/2006 | Ii et al. | 700/19 |
| 7,250,854 B2 * | 7/2007 | Rezvani et al. | 340/506 |
| 7,284,038 B2 * | 10/2007 | Kraslavsky | 709/217 |
| 7,526,595 B2 * | 4/2009 | Drerup et al. | 710/311 |
| 7,555,720 B2 * | 6/2009 | O'Rourke | 715/739 |
| 7,630,300 B2 * | 12/2009 | Warren et al. | 370/222 |
| 7,743,556 B2 * | 6/2010 | Stoffels | 49/394 |
| 7,890,868 B2 * | 2/2011 | Shah et al. | 715/733 |
| 8,325,916 B2 * | 12/2012 | Oliveira et al. | 380/200 |

(Continued)

FOREIGN PATENT DOCUMENTS

JP 11110109 A 4/1999

OTHER PUBLICATIONS

"Media Center Extender Overview"; www.microsoft.com/windowsxp/mediacenter/evaluation/devices/default.mspx; Oct. 12, 2004; 1 page.

(Continued)

Primary Examiner — Helen Shibru
(74) Attorney, Agent, or Firm — Carole Boelitz; Andrew Sanders; Micky Minhas

(57) ABSTRACT

Disparate devices in an audio/video ecosystem may be connected and managed by having multiple crossbar connections at nodes in a node and leaf network. The leaves of the network may be various audio and video devices, with receivers, personal computers, and other devices comprising the nodes, which have at least some crossbar switching ability. When the nodes are connected, some or all of the devices attached to all of the nodes may be made available at each interface for control and display. Each node may act as a crossbar, allowing a user at each interface to enjoy the services of any device, regardless of the node to which the device is attached.

25 Claims, 6 Drawing Sheets

(56) References Cited

U.S. PATENT DOCUMENTS

| | | | |
|---|---|---|---|
| 8,421,746 B2* | 4/2013 | Igoe | 345/156 |
| 2002/0035404 A1* | 3/2002 | Ficco et al. | 700/65 |
| 2002/0103897 A1* | 8/2002 | Rezvani et al. | 709/224 |
| 2002/0105543 A1* | 8/2002 | Dong et al. | 345/744 |
| 2002/0128071 A1 | 9/2002 | Pates | |
| 2002/0144264 A1* | 10/2002 | Broadus | 725/39 |
| 2003/0135663 A1* | 7/2003 | Duncan et al. | 709/321 |
| 2003/0159150 A1* | 8/2003 | Chernock et al. | 725/58 |
| 2004/0001095 A1 | 1/2004 | Marques | |
| 2004/0031058 A1* | 2/2004 | Reisman | 725/112 |
| 2004/0187157 A1 | 9/2004 | Chong et al. | |
| 2004/0205829 A1 | 10/2004 | Hane | |
| 2005/0113941 A1* | 5/2005 | Ii et al. | 700/19 |
| 2006/0007400 A1* | 1/2006 | Castaldi et al. | 353/30 |
| 2006/0029058 A1* | 2/2006 | Reed et al. | 370/388 |
| 2006/0031889 A1* | 2/2006 | Bennett et al. | 725/80 |
| 2006/0200570 A1* | 9/2006 | Stirbu et al. | 709/230 |
| 2006/0230248 A1* | 10/2006 | Honda et al. | 711/170 |
| 2008/0276273 A1* | 11/2008 | Billmaier et al. | 725/37 |
| 2009/0024746 A1* | 1/2009 | Welch | 709/228 |

OTHER PUBLICATIONS

"Meedio HouseBot"; http://www.meedio.com/whatismeedio/housebot/; Feb. 17, 2005; 3 pages.

Fact Sheet, HP z540 Digital Entertainment Center, HP z540-b Digital Entertainment Center; www.hp.com/hpinfo/newsroom/press_kits/2004/declaunch/fs_dec.pdf; Oct. 2004; 6 pages.

* cited by examiner

300
VIRTUAL
NETWORK AS
SEEN FROM
ONE NODE

AGGREGATED AUDIO/VIDEO CROSSBAR CONNECTIONS

BACKGROUND a. Technical Field

The present invention pertains generally to audio/visual systems and specifically to audio/visual devices connected using a network.

b. Description of the Background

Home audio and video systems are become more complex and integrated. In many systems, a centralized device may control several peripheral devices, allowing a user a single interface into several devices. For example, an audio/video receiver may operate several audio or video devices through a single remote control, allowing a user to operate all the devices through a single remote control interface.

Personal computers add another dimension to the home audio/video ecosystem, adding additional audio/video sources, displays, and points of control. However, the integration of the various devices on the personal computer into the audio/video ecosystem has posed several problems, including connecting and controlling the host of various devices through different connections. These various connections can be complex and difficult to set up, especially when input and output devices may be shared throughout the ecosystem.

SUMMARY

Various interface devices may be connected to various audio and video devices in a node and leaf arrangement, where the interface devices on the nodes have at least some crossbar switching ability. When the nodes are connected, some or all of the devices attached to all of the nodes may be made available at each interface for control and for output from the devices. Each node may act as a crossbar, allowing a user at each interface to enjoy the services of any device, regardless of the node to which the device is attached.

DETAILED DESCRIPTION

Figure 1:
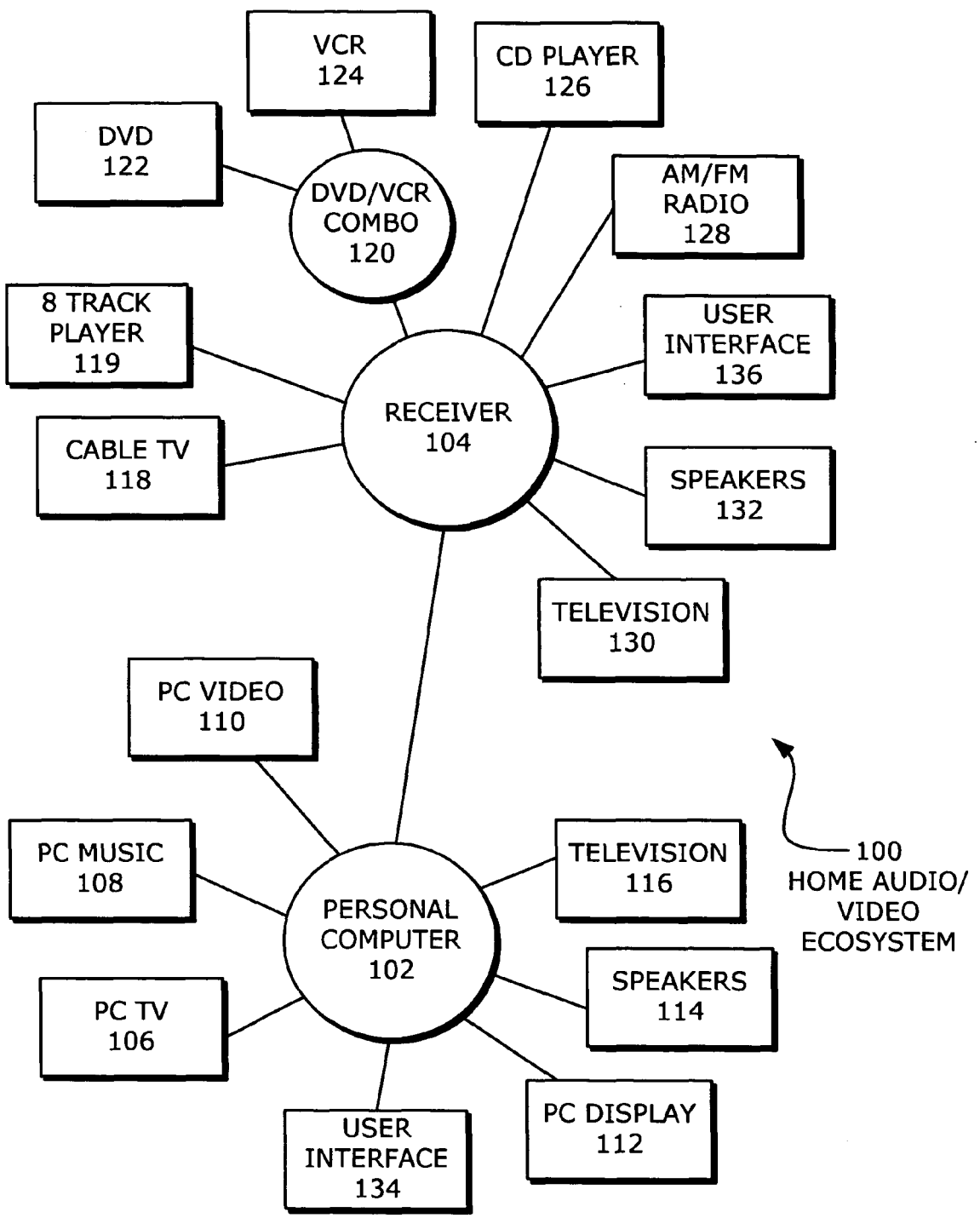
FIG. 1 is a diagrammatic illustration of an embodiment showing a typical home audio/video ecosystem.

While the invention is susceptible to various modifications and alternative forms, specific embodiments of the invention are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. In general, the embodiments were selected to highlight specific inventive aspects or features of the invention.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The invention may be embodied as devices, systems, methods, and/or computer program products. Accordingly, some or all of the invention may be embodied in hardware and/or in software (including firmware, resident software, micro-code, state machines, gate arrays, etc.) Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the invention is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 illustrates an embodiment 100 showing a home audio/visual ecosystem. A personal computer 102 and a receiver 104 are the nodes to which other peripheral devices are attached. Input devices attached to the personal computer 102 include a PC TV application 106, PC music applications 108, and PC video applications 110. Output devices attached to the personal computer 102 include the PC display 112, speakers 114, and a television 116.

The audio/visual receiver 104 has several input devices attached, including a cable television input 118, an 8-track player 119, a DVD/VCR combination device 120 that includes a DVD player 122 and VCR player/recorder 124, and a CD player 126, AM/FM radio 128. Output devices attached to the receiver 104 include a television 130 and speakers 132. In some cases, the AM/FM radio 128 may be integrated in the receiver 104 or may be a separate component.

The personal computer 102 may have a user interface 134. Similarly, the receiver 104 may have user interface 136.

The embodiment 100 illustrates a network connection by which many different devices may be shared across different nodes of a home audio/visual ecosystem. Devices connected to one node of the network may be made available to another node of the network. A node may collect information about the devices attached to it then transmit the information to another node, which may then use the information to operate the device by the other node.

The embodiment 100 illustrates a diverse set of audio/visual equipment that may be found in a home. The personal computer 102 often contains a handful of applications that perform audio/visual functions such as DVD playback, MP3 music storage and playback. In addition, some personal computers have direct input and playback of television signals as well as a television output 116. The receiver 104 often acts as a controller for several devices that may be connected to a television 130 and/or speakers 132. In some embodiments, the receiver function may be integrated into a television 130 or may be a separate component.

The embodiment 100 shows a leaf and node network configuration for the various devices. The personal computer 102 and the receiver 104 act as nodes, which may connect the various components together. For example, the receiver 104 may connect the cable television input 118 to the television 130 and speakers 132. The receiver 104 may then be reconfigured to record the cable television input 118 onto the VCR 124 through the DVD/VCR combination device 120, while simultaneously displaying the video feed on the television 130 and speakers 132. In another configuration, the receiver 104 may connect the AM/FM radio 128 to the speakers 132. In such an example, the receiver 104 may act as a crossbar, enabling various input devices to be connected to various output devices. In some situations, a device may have both input and output functions, such as the VCR which may perform an input function during playback and an output function during record.

In the leaf and node arrangement of embodiment 100, the nodes may act as crossbar switches. In some embodiments, the crossbar switches may enable any connection to be made with any other connection, while in other embodiments, the crossbar switches may have specific input and output ports and may restrict the possible connections between the various ports. In some embodiments, the nodes may allow multiple simultaneous transmission paths through the node. For example, the cable television input 118 may be directed through the node and out to the VCR 124 while the 8 track input 119 is simultaneously directed to the speakers 132.

In some embodiments, a crossbar switch may allow any input to be connected to any output otherwise known as an N×N switch. In other embodiments, the crossbar switch may be a 1×N switch, where an output may be connected to several outputs. In such embodiments, some inputs may only be able to be switched to a subset of the total number of outputs. For the purposes of this specification, a crossbar switch shall mean any mechanism capable of connecting at least one input to at least one output. In some instances, not all inputs may be connectable to all outputs.

The network arrangement of embodiment 100 consists of two general types of devices: node devices and peripheral devices. The peripheral devices may be any type of audio/visual source device, recording device, display device, or other audio/visual processing device. The node devices may serve as a central interface and crossbar connection to the various peripheral devices.

The node devices and peripheral devices may have one or more connections between each device. For example, a connection between a node and source may have a dedicated audio or video connection plus a control channel connection. In other examples a single connection may combine both control and audio or video data channels.

Some peripheral devices may be separate, discrete components while other peripheral devices may be integrated into the same component as the node. For example, an audio/visual receiver may have a built-in or integrated AM/FM radio or cable television decoder. In another example, a personal computer may act as a node, but have an integrated CD/DVD player or television input. Integrated components may operate like leaf devices in the leaf and node network configuration.

Many audio and video peripherals have dedicated audio and video connections. For example, a cable television set top box may have S-video output, coaxial cable output, separate audio outputs, or other video or audio connections. Additionally, such a box may include a communications channel such as a serial port, USB port, Ethernet port wireless communication port, infrared data port, or any other communications channel.

In some cases, a communications port may be a one way directional port, where commands may be sent to the peripheral but no status or acknowledgement signal may be received by the node.

Some peripherals may be connected by a single connection between the peripheral and the node. For example, a personal computer node may connect to an attached DVD device through an IDE interface or connect to a PC TV card through a PCI bus connection, USB, IEEE 1394, or any other type of connection. Other devices may be connected through an Ethernet connection or may be wirelessly attached.

In some embodiments, several devices may share a single communication channel. In an example of Ethernet or USB connections, several devices may all connect to a node through the connection. In other embodiments, each peripheral device may have a separate dedicated control connection between the node and the peripheral device.

The embodiment 100 may operate by having a node collect information about each of the devices connected to the node and share the information to other nodes about the devices. This shared information may then be used by the other nodes to connect the device to the other node.

The information sent from the devices to the nodes may encompass a range of data. In a simple embodiment, the device may indicate a network address and a device type. In a more complex embodiment, the device may share information such as a text string indicating its name, various capabilities that are currently available on the device. In still other embodiments, the shared information may include a command set for operating the device, bitmaps or other graphic images to depict the device or the content available on the device, or any other information useful to display the availability and status of the device, as well as information necessary to control the device.

In some embodiments, the device information may be found by transmitting device information from the peripheral device to the node. This transaction may be initiated by a query from the node or by the peripheral device broadcasting its status. For example when a device is connected, a communications handshake may occur after which a query may initiate sharing configuration information between the devices. In many such cases, the node may transfer information from the node to the device, directing the device to configure in an appropriate manner for the node. Similarly, the node may receive information from the device so that the node may know the appropriate settings by which to interface to the device.

The device may send setup information that may contain descriptions of the commands that may be received by the device. The command descriptors may be used by the node to perform any type of control of the device. In some instances, the command descriptors may be a reduced set of instructions from all of the possible instructions for the device, due to various reasons, including installation settings made by a user or the currently available connections between the device and node.

The communication connection between the device and node may be used for continuous or frequent status data to be passed between the device and the node. In some situations, the device may regularly send its status, especially when the device is in operation. For example, the device may send periodic updates as to the remaining length of a recording or the title of a video program.

In some embodiments, the device information may be determined by manual input by a user directly into a node. For example, when a new device, such as an 8-track tape player 119, is attached to a receiver 104, the older 8-track tape player may not have a secondary communications connection but may only have an analog stereo audio connection. A user may set the input port on the receiver to an 8-track tape input. In some embodiments, the user may be able to type in a text identifier for the input or select one from a list. The text identifier, plus any other information about the device, may be used by other nodes to present the node to a user for use.

In other embodiments, the node may collect information about the attached devices by sensing the device attached to a port. For example, if audio connections are attached to a specific input port of the receiver 104, the receiver may electrically sense the attachment and determine that an audio device is present on that port. Even if no further communication occurs between the audio device and the receiver 104, the receiver 104 may make the audio device available to another node on the system. In order to operate the audio device, a user may need to manually operate the device by pressing a button on the device itself or use a remote control specifically dedicated to the device.

The user interfaces 134 and 136 may be any type of input/output device. For example, a user interface 134 attached to a personal computer may be a remote control, keyboard, mouse, GUI, or other type of interface. Similarly, a receiver 104 may have a user interface that includes a display of different devices, lights to indicate various status levels, a remote control with touch screen or button controls, a set of knobs and switches on the front panel of the receiver, or any other type of user interface. In some cases, the user interface may include the television and speakers attached to the node, which may provide feedback or other information when a remote control, keyboard, or other device is actuated. Any type of user interface may be used by any node.

The user interface available on each node may comprise a mechanism for the user to receive data and a mechanism for the user to input date. In a simple embodiment of a user interface, a panel with one or more single element LEDs may show the availability and status of devices on the network, while the user may select and operate the device through switches or knobs on the interface.

In a more complex embodiment of a user interface, the user may use a multi-button remote control to input data in conjunction with messages or graphical images displayed on an output device. In some such embodiments, the output device of the user interface may be one of the normal output devices for playing the media from one of the peripheral devices. For example, the television 116 connected to the personal computer 102 may display text, graphics, or other images for feedback to the user as part of the user interface. In another example, the speakers 132 attached to the receiver 104 may comprise some or all of the user feedback mechanism of the user interface. In still another example, the personal computer 102 may have a PC display 112 and a mouse, trackball, other pointing device, and/or a keyboard input device.

In still other embodiments, the user interface may be a single, dedicated device. For example, a handheld remote control may include a touchscreen display that may display text, graphics, or other still or moving images to serve as output for the user.

For the purposes of this specification, a user interface may be any device or combination of devices wherein a user may provide at least some input and receive at least some output. In some cases, the user interface may comprise one or more peripheral devices.

Any number of nodes and devices may be connected in a leaf and node arrangement. In some embodiments having many nodes, the nodes may be connected in various manners and may have two or more available communications paths established between two remote nodes. In other embodiments, one connection path may exist between any two nodes. In an embodiment with multiple nodes, each node may be connected, for example, to an Ethernet network or other packetized network and able to directly connect to any other node on the network. In another embodiment with multiple nodes, the nodes may be connected in a linear path such that a connection between two nodes may have to pass through several intermediate nodes. Various connection mechanisms and network configurations may be used to connect the nodes together.

Figure 2:
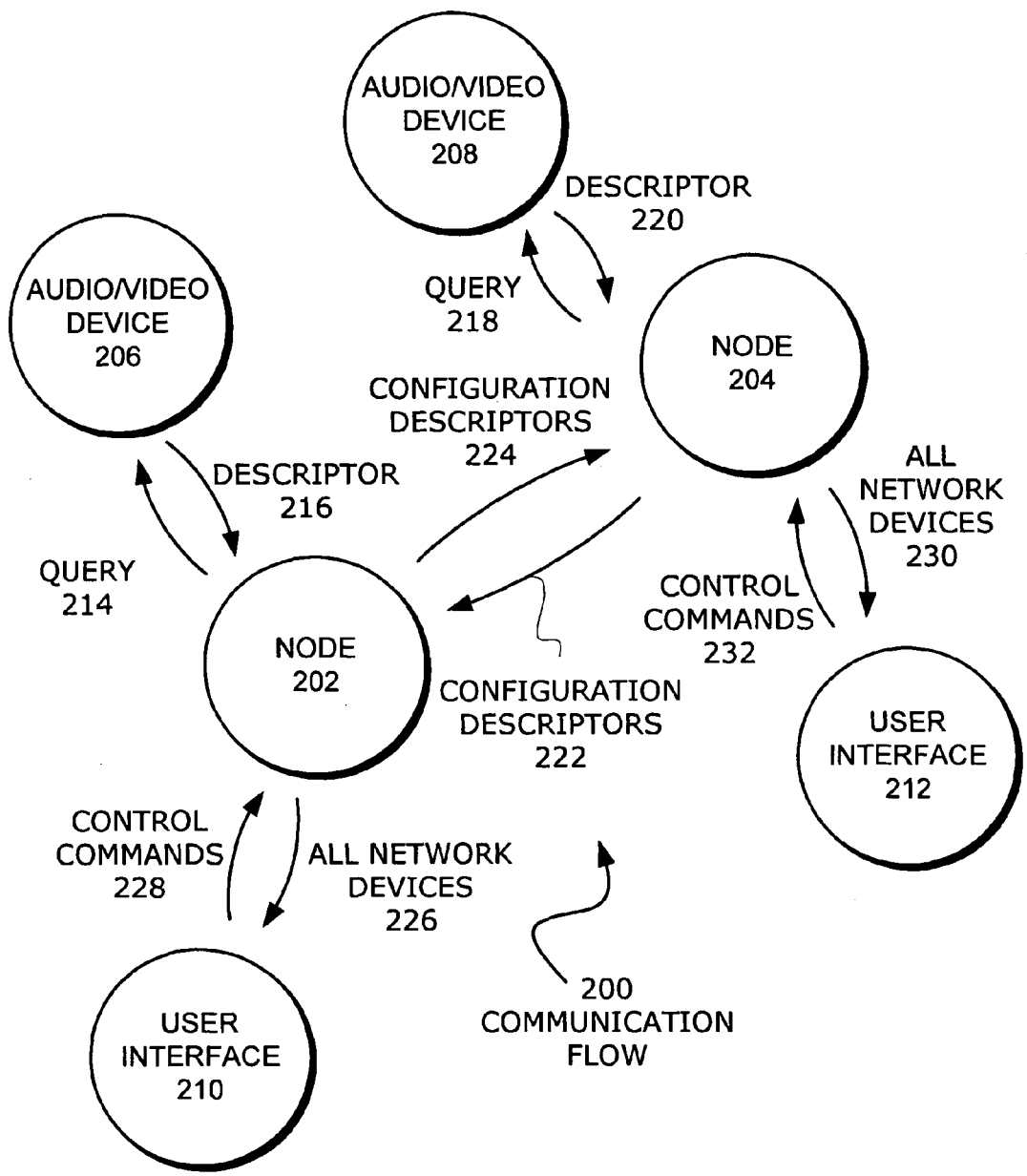
FIG. 2 is an interaction diagram of an embodiment showing the communication flow between nodes and devices.

FIG. 2 is an illustration of an embodiment 200 showing the flow of communications between various devices. Two nodes 202 and 204 are connected to audio/video devices 206 and 208, respectively. The nodes 202 and 204 each have user interfaces 210 and 212, respectively.

The node 202 may communicate with the device 206 by sending a query 214 and receiving a descriptor 216. Similarly, node 204 may communicate with device 208 by sending a query 218 and receiving a descriptor 220. After collecting the descriptors for the devices attached to each of the nodes, the two nodes each send the configuration descriptors 222, 224 to each other. Node 202 may show all network devices 226 as available on the user interface 210, through which a user may issue control commands 228 to either device 206 or 208. Similarly, all of the network devices 230 are made available on user interface 212, through which the same or a different user may issue control commands 232 to either device 206 or 208.

Embodiment 200 illustrates one method by which the devices attached to nodes on the network may be made available to other nodes. After collecting descriptors of all attached devices, the nodes may send the descriptors to other nodes. The other nodes may display the available devices and send commands to operate and connect any device over the network.

The descriptors of each device may include an identifier for the device on the network. An address may be assigned to the device by a node when it is attached. In another embodiment, addresses for each device and/or node may be assigned by the manufacturer and may be unique to all other devices. In still other embodiments, addresses for nodes and devices may be assigned by a device attached to the network in a similar manner as a DHCP server in a TCP/IP network. In such embodiments, one device on the network may assign addresses to the devices and/or nodes of the network.

The configuration descriptors 222 and 224 that are exchanged between nodes may include actual addresses for each attached device. When a node requests connection to a specific device attached to another node, or sends a command to the device, the request or command may include the actual address of the attached device.

In other embodiments, the configuration descriptors 222 and 224 may include the addresses of the nodes to which the devices are attached, and the actual addresses of the peripheral devices may be determined by the node to which they are attached. For example, a first node may send a list of available peripheral devices to another node. When the other node sends a command to the peripheral device, the address may be merely for a feature attached to the first node. The first node may then interpret the command, determine the specific address of the peripheral device, and send the command to the device at the address. Many different communication and addressing schemes may be used in order to enable communication and control of the various peripheral devices by some or all of the nodes.

Figure 3:
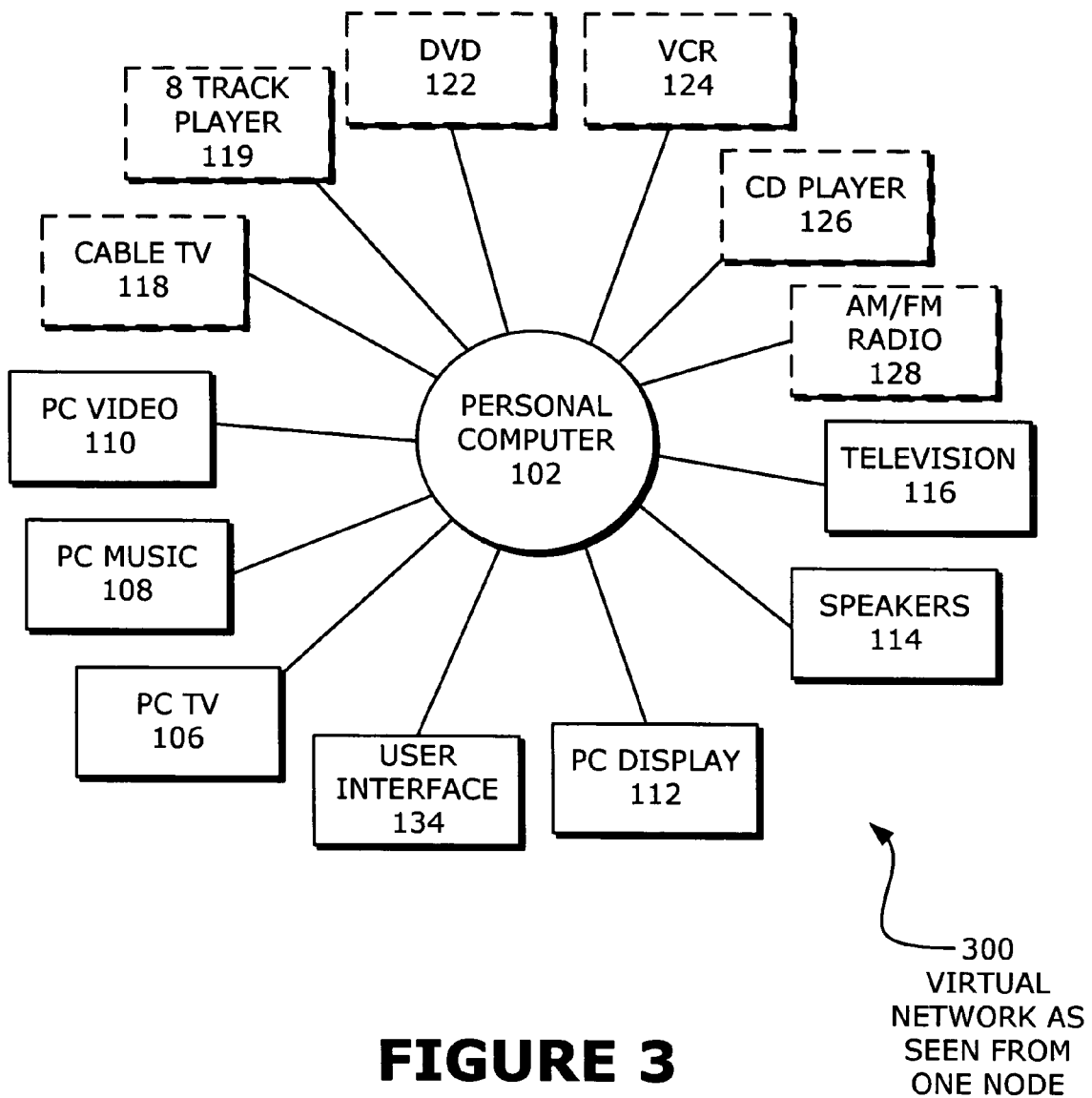
FIG. 3 is a diagrammatic illustration of an embodiment showing a virtual network as seen from one node.

FIG. 3 illustrates an embodiment 300 showing a virtual network as seen from a single node of FIG. 1. The personal computer 102 has as output devices a PC display 112, speakers 114, a television 116, and a user interface 116. Input devices attached to the personal computer 102 include PC TV 106, PC music 108, and PC video 110. Several other input devices may be made available through the receiver 104, including cable television 118, DVD 122, VCR 124, CD player 126, FM radio 128, and 8 track player 119.

The devices attached to the receiver 104 may be made available to the user of the personal computer 102 in several different manners. In one embodiment, the receiver's devices may be presented and controlled in the same manner as the devices attached directly to the personal computer. In such an embodiment, all of the devices on the network are presented equally. In another embodiment, a device attached to a remote node may have a color coding, icon, or other indicator that shows that the device is remotely attached. Such an indicator may include a designation for the particular remote node so that the user would know to which DVD player an indictor refers, should several DVD players be attached to the network, for example.

The various devices may be presented as a flat structure, as shown in embodiment 300, or may be presented in a hierarchical or categorized structure. For example, all available playback devices may be grouped and/or ranked by preference, proximity to the current node, availability, or any other criteria. In other embodiments, the various devices may be presented in groups according to the node to which they are attached.

The devices are presented to the user of the personal computer 102 so that the user may be able to operate any of the presented devices. When using a device attached to another node, the user interaction may be just like the device was attached to the user's node. When a remote device is selected, the remote node may configure itself so that data from the device, sometimes in the form of direct analog audio or video connections with separate command and control connections, may be connected to the user's node and operable with full or partial functionality. In some embodiments, remote devices may have certain functions that are available on directly attached nodes while a reduced capability or instruction set may be available on other nodes. The reduced capability may be a function of the node itself, the nature of the connections between the nodes, user preference, or any other reason.

Figure 4:
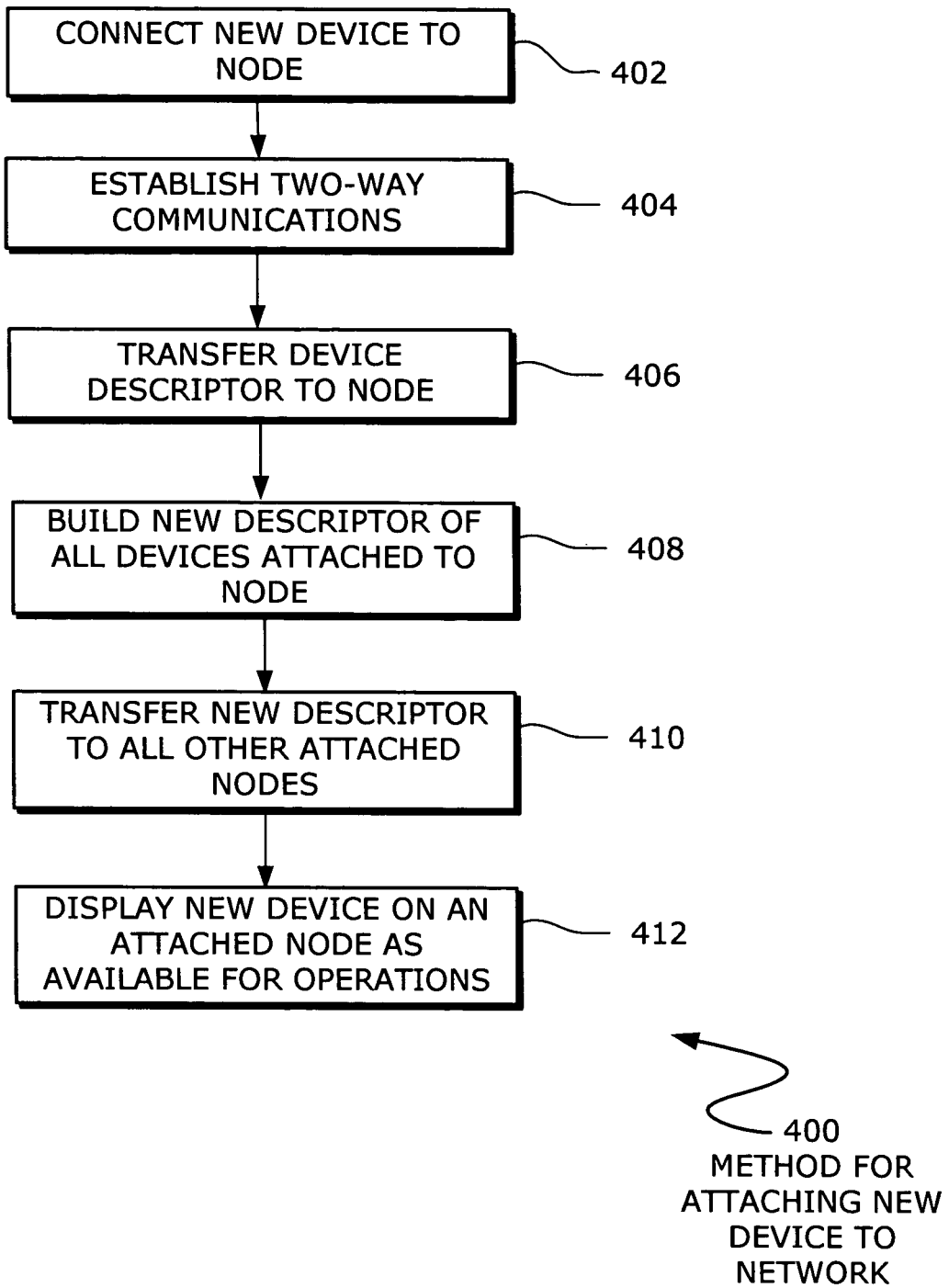
FIG. 4 is a flowchart illustration of an embodiment showing a method for attaching a new device to a network.

FIG. 4 is a flowchart illustration of an embodiment 400 of a method for attaching a new device to a network. In block 402, a new device is connected to a node, and two-way communications are established in block 404. A descriptor of the device is transferred to the node in block 406. The node may build a new node descriptor, comprising all the devices attached to the node in block 408. The new node descriptor may be transferred to adjacent nodes in block 410, and the new device may be displayed on an attach node's user interface as available in block 412.

Embodiment 400 is one method by which a new device may be made available to other nodes over the network. Data from the new device is added to a descriptor of all the devices currently attached to the node, and the updated descriptor may then be sent to remote nodes, making the device available.

The descriptor may be a human readable text based descriptor such as XML or other such descriptor language. In some embodiments, the descriptor may be a proprietary language or may be a computer-readable set of bits or bytes of description.

In the embodiment 400, the node aggregates the descriptions of the attached devices and makes the aggregated description available to other nodes. In some cases, a device may only be operable at that node and may not be sharable. In such cases, a descriptor for the device may not be included in the aggregated description or the device may be included. When such a device is included in the aggregated description, the device may be noted as a non-sharable device or otherwise unavailable.

The status of devices attached to a node may be collected, aggregated, and transmitted to other nodes on a periodic basis. The status may include whether the device is operable, in use, the node requesting a current operation, the title of an audio or video program loaded on the device, or any other status data that may be available by the device. The status of each device may be collected and broadcast to other nodes on a near-real time basis, such as every fraction of a second or every few seconds, or may be done less frequently. The status may be collected and broadcast when an event occurs, such as a new compact disk being loaded into a compact disk player, or when a remote node executes a command on the device.

In other embodiments, the status or descriptor of a device may be transferred by its host node to other nodes without aggregating the status of every device. In such embodiments, other nodes may maintain a list of available devices and possibly their statuses. Such lists may be updated periodically to ensure that the devices are actually still available or that the status is current.

In some cases, when a new device is attached to a node as in block 402, a user may manually indicate all or a portion of the data that may be used to create the descriptor of block 408. For example, if a device does not have an embedded descriptor that may be automatically queried, a user may select a device identification from a table, pull down list, enter the model number of the device, or otherwise manually describe the device to the node. In addition, the node may sense the connections used by the device and determine some properties of the device through the type and performance of the signals received.

Figure 5:
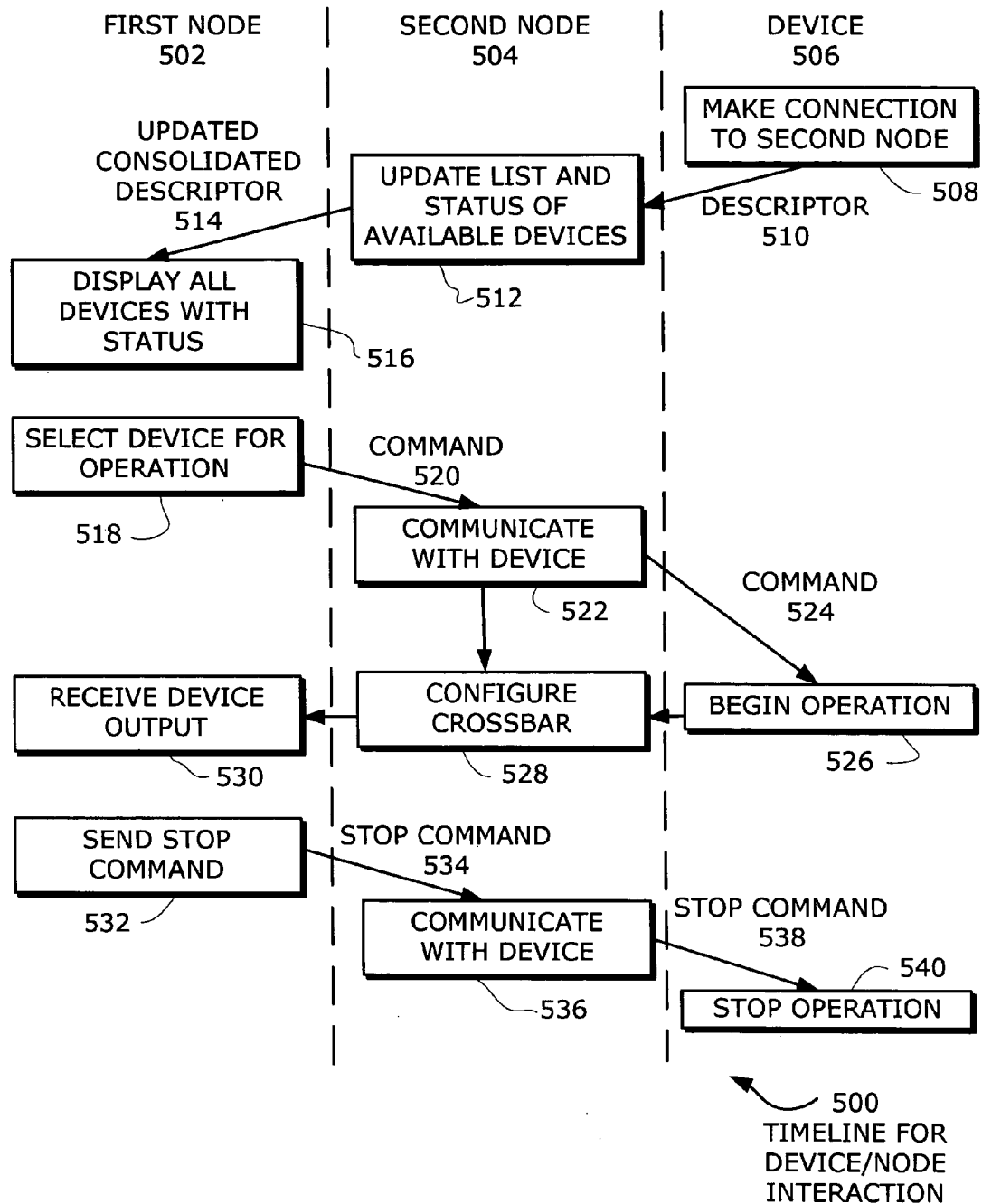
FIG. 5 is a timeline illustration of an embodiment showing some interactions between a device and two nodes.

FIG. 5 is a timeline illustration of an embodiment 500 showing the timeline for device/node interactions. The left column contains actions by a first node 502, the center column contains actions by a second node 504, and the right column contains actions by a device 506 that is attached to the second node.

The device 506 is connected to the second node 504 in block 508, and sends descriptor 510 to the second node 504. The second node 504 updates the list and status of available devices in block 512 and send a descriptor 514 to the first node 502, which displays all the devices and statuses in block 516.

The first node 502 selects the device 506 for operation in block 518 and sends a command 520 to the second node 504, which communicates in block 522 with the device 506. The second node 504 sends a command 524 to device 506, which begins operation in block 526. Meanwhile, the second node 504 configures its internal crossbar in block 528 to transmit the device output, which is received by the first node 502 in block 530.

The first node 502 may produce a stop command in block 532. The stop command 534 is received by the second node 504 in block 536, and passes a stop command 538 to the device 506, which stops operation in block 540.

Embodiment 500 illustrates the action of simple commands between a node and a device connected through another node. After receiving the status and description of the device 506, the first node 502 issues a command 520 to begin transmission. The second node 504 may interpret the command, configure the crossbar connection on the second node to direct the output from the device 506 to the first node 502, and issue the appropriate command to the device 506 to begin sending data. At some point, the first node may issue a stop command 534, which may be relayed to the device 506 by the second node 504.

With the first command 520, the second node 504 interpreted the command 520 to perform an operation on the second node 504 as well as the device 506. The command 520 may have contained an address for the device 506 and the command 524 that was sent from the second node 504. The second node 504 may have performed the crossbar configuration of block 528 by inferring that action from the command 520. In another embodiment, the command 520 may have also included the appropriate setup instructions for the second node 504 to configure the crossbar connection in block 528.

Figure 6:
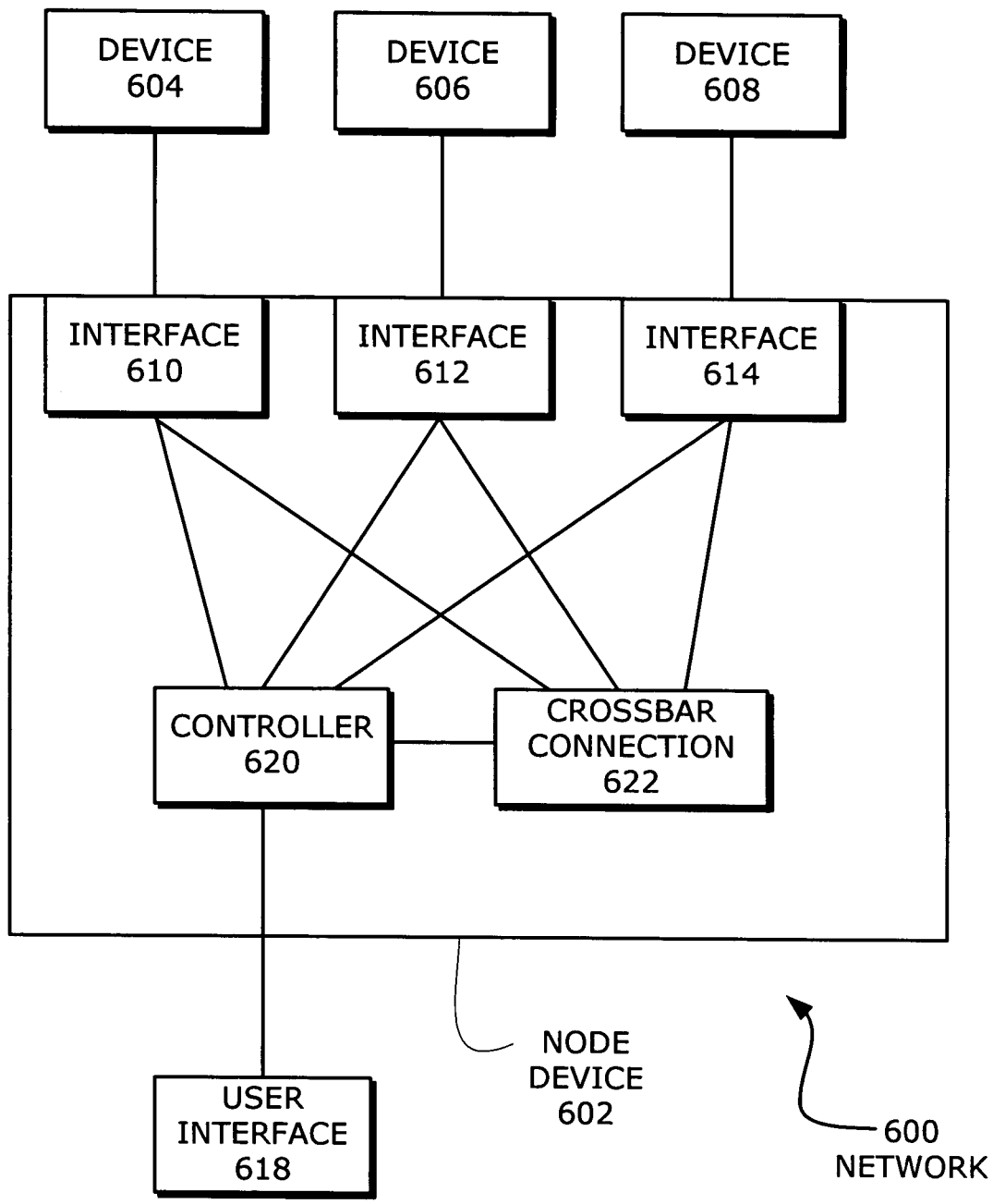
FIG. 6 is a diagrammatic illustration of an embodiment of a network with a node device.

FIG. 6 illustrates an embodiment 600 of a network having a node device. The node device 602 is connected to external devices 604, 606, and 608 through interfaces 610, 612, and 614, respectively. The controller 620 is connected to user interface 618 as well as each of the interfaces. Each interface is further connected to a crossbar connection 622.

The node device 602 may be capable of connecting any external device to any other external device. In other embodiments, a node device 602 may have any number of interfaces, each capable of connecting to one or more devices.

The devices 604, 606, and 608 may be any type of audio, video, or other media source. In some cases, one of the devices may be another node device similar to node 602 and may have other devices attached thereto. The devices may be sources, such as cable television input, or recording devices such as a DVD recorder. In some cases, the device may be capable of sourcing or recording media, such as a VCR tape player/recorder.

The crossbar connection 622 may connect any device to any other device. The crossbar connection 622 may be capable of switching one device to one other device, or may be capable of switching one device to two or more other devices. In some embodiments, two or more parallel connections may be made, such that a first device may be connected to a second device while a third device may be separately connected to a fourth device.

The connections may be any type of signal carrying connection, such as analog audio, analog video, digital audio, digital video, a combination of audio and video, or any other type of signal carrying connection including digitized signals in packetized form. The connections may be electrical, optical, or any other signal carrying medium.

The crossbar connection 622 may be a series of controllable switches, such as mechanical relays or transistors, or may be any other technology capable of routing a signal from one interface to another. For example, if the signals were digitized and transmitted over a serial or parallel interface, the crossbar connection may be any type of bus capable of routing the signal from one interface to another. The architecture and technology used for the crossbar connection 622 may be any type of switchable connection technology capable of directing signals.

The controller 620 may be capable to sending and receiving messages through the various interfaces to the devices. The messages may include requests for information concerning the devices or the media contained therein, commands to be executed by the devices, or any other communication. Various information and data may be input or displayed on the user interface 618. For example, commands may be input through the user interface 618, translated by the controller 620, and communicated to the various devices. Further, the status of one or more of the devices or crossbar connections may be displayed on the user interface 618.

Based on input from the user interface 618, the controller 620 may cause the crossbar connection 622 to connect one device to one or more of the other devices. In some cases, the crossbar connection 622 may enable several parallel connections to be made between two or more pairs of devices.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising:

communicating with multiple audio/video source devices of a first set of audio/video source devices by a first node, said first node having a first user interface, said first node attached to each audio/video source device of the first set of audio/video source devices, and said first node further attached to a first audio/video output device;

transferring a first aggregated descriptor that includes information regarding each audio/video source device of said first set of audio/video source devices to a second node, said second node having a second user interface, and said second node attached to multiple audio/video source devices of a second set of audio/video source devices, and said second node attached to a second audio/video output device;

storing said first aggregated descriptor on said second node;

displaying references to said multiple audio/video source devices of the first set of audio/video source devices on said second user interface, said references being based on said first aggregated descriptor;

selecting an audio/video source device of the first set of audio/video source devices for display on said second audio/video output device;

transmitting a first request to said second node from said first node;

configuring said first node to transmit a first audio/video signal from said selected audio/video source device of the first set of audio/video source devices to said second node;

displaying said first audio/video signal on said second audio/video output device;

communicating with multiple audio/video source devices of said second set of multiple audio/video source devices by said second node;

creating a second aggregated descriptor for said second set of multiple audio/video source devices;

transferring said second aggregated descriptor to said first node;

displaying references to said multiple audio/video source devices of said second set of multiple audio/video source devices on said first user interface, said references being based on said second aggregated descriptor;

selecting an audio/video source device of the second set of audio/video source devices for display on said first audio/video output device;

transmitting a second request to said first node from said second node;

configuring said second node to transmit a second audio/video signal from said selected audio/video source device of the second set of audio/video source devices to said first node; and displaying said second audio/video signal on said first audio/video output device.

2. The method of claim 1 wherein said first audio/video signal and said second audio/video signal are output in parallel.

3. The method of claim 1 wherein said first node comprises an audio/video receiver.

4. The method of claim 1 wherein said second node comprises a personal computer.

5. The method of claim 1 wherein said first node is connected to said first device using a data channel and a communication channel, said data channel comprising an audio transmission path.

6. The method of claim 1, said first aggregated descriptor comprising a command.

7. The method of claim 1 further comprising creating said first aggregated descriptor by said first node, said first node being configured to perform a method comprising:

discovering a first audio/video source device;

querying said first audio/video source device;

receiving a first portion of a first descriptor from said first audio/video source device; and creating said first aggregated descriptor, said first aggregated descriptor comprising said first portion.

8. A device comprising:

a first user interface;

a crossbar switch permitting multiple simultaneous audio/video connections between node devices and a plurality of audio/video source devices attached to said device;

a first interface configured to connect with a first audio/video source device of the plurality of audio/video source devices and to create a first aggregated descriptor including information regarding multiple first audio/video source devices of the plurality of audio/video source devices; and a second interface configured to connect to a node device, transfer said first aggregated descriptor to said node device, said node device having a second user interface, said node device being configured to display references to said multiple first audio/video source devices of the plurality of audio/video source devices on said second user interface, said references being based on said first aggregated descriptor, said second interface being further configured to receive a request from said node device and configure said crossbar switch to connect said first audio/video source device to said second user interface.

9. The device of claim 8, said crossbar switch being capable of making two separate simultaneous connections.

10. The device of claim 8, said crossbar switch being capable of receiving at least one incoming audio/video signal from at least one node device while simultaneously enabling access by multiple node devices to respective audio/video source devices of the plurality of audio/video source devices.

11. The device of claim 8, wherein the first aggregated descriptor includes information regarding a non-shared audio/video source device of the plurality of audio/video source devices.

12. The device of claim 11, wherein the information regarding the non-shared audio/video source device of the plurality of audio/video source devices includes an indication that the non-shared audio/video source device is unavailable.

13. The device of claim 8, wherein the first interface is further configured to update the first aggregated descriptor in response to the request received from the node device, and wherein the second interface is further configured to transfer the updated first aggregated descriptor to the node device.

14. The method of claim 1, wherein the first aggregated descriptor includes information regarding a non-shared audio/video source device of the first set of audio/video source devices.

15. The method of claim 14, wherein the information regarding the non-shared audio/video source device of the first set of audio/video source devices includes an indication that the non-shared audio/video source device is not shared.

16. The device of claim 8, wherein the first aggregated descriptor includes information regarding whether each of the audio/video source devices of the multiple audio/video source devices is operable, whether each of the audio/video source devices of the multiple audio/video source devices is requesting a current operation, and regarding title information for programs loaded on each of the audio/video source devices of the multiple audio/video source devices.

17. The method of claim 1, wherein the method further comprises:
updating the first aggregated descriptor in response to a command received from the second node; and
retransmitting the updated aggregated descriptor from the first node to the second node.

18. A method comprising:
permitting, via a crossbar switch of a computing device, multiple simultaneous audio/video connections between node devices and a plurality of audio/video source devices attached to the computing device;
connecting, via a first interface of the computing device, with a first audio/video source device of the plurality of audio/video source devices;
creating a first aggregated descriptor that includes information regarding multiple audio/video source devices of the plurality of audio/video source devices;
connecting, via a second interface of the computing device, to a node device having a user interface configured to display references to the multiple audio/video source devices of the plurality of audio/video source devices, the references being based on the first aggregated descriptor;
transferring, via the second interface, the first aggregated descriptor to the node device;
receiving a request from the node device to configure the crossbar switch to connect the first audio/video source device to the user interface of the node device; and
in response to the request, configuring the crossbar switch to connect the first audio/video source device to the user interface of the node device.

19. The method of claim 18, wherein the first aggregated descriptor includes information regarding a non-shared audio/video source device of the multiple audio/video source devices, and wherein the information regarding the non-shared audio/video source device of the multiple audio/video source devices includes an indication that the non-shared audio/video source device is unavailable.

20. The method of claim 18, further comprising:
updating the first aggregated descriptor in response to the request received from the node device; and
transferring the updated first aggregated descriptor to the node device.

21. The method of claim 18, wherein the first aggregated descriptor includes information regarding whether each of the audio/video source devices of the multiple audio/video source devices is operable, whether each of the audio/video source devices of the multiple audio/video source devices is requesting a current operation, and regarding title information for programs loaded on each of the audio/video source devices of the multiple audio/video source devices.

22. A computer storage medium having instructions stored therein, the instructions for causing a computing device to:
permit, via a crossbar switch of the computing device, multiple simultaneous audio/video connections between node devices and a plurality of audio/video source devices attached to the computing device;
connect, via a first interface of the computing device, with a first audio/video source device of the plurality of audio/video source devices;
create a first aggregated descriptor that includes information regarding multiple audio/video source devices of the plurality of audio/video source devices;
connect, via a second interface of the computing device, to a node device having a user interface configured to display references to the multiple audio/video source devices of the plurality of audio/video source devices, the references being based on the first aggregated descriptor;
transfer, via the second interface, the first aggregated descriptor to the node device;
receive a request from the node device to configure the crossbar switch to connect the first audio/video source device to the node device; and
in response to the request, configure the crossbar switch to connect the first audio/video source device to the node device.

23. The computer storage medium of claim 22, wherein the first aggregated descriptor includes information regarding a non-shared audio/video source device of the plurality of audio/video source devices, and wherein the information regarding the non-shared audio/video source device of the plurality of audio/video source devices includes an indication that the non-shared audio/video source device is unavailable.

24. The computer storage medium of claim 22, wherein the instructions are further for causing the computing device to:
updating the first aggregated descriptor in response to the request received from the node device; and
transferring the updated first aggregated descriptor to the node device.

25. The computer storage medium of claim 22, wherein the first aggregated descriptor includes information regarding whether each of the audio/video source devices of the multiple audio/video source devices is operable, whether each of the audio/video source devices of the multiple audio/video source devices is requesting a current operation, and regarding title information for programs loaded on each of the audio/video source devices of the multiple audio/video source devices.

* * * * *